(12) United States Patent
Parisien et al.

(10) Patent No.: US 6,795,555 B1
(45) Date of Patent: Sep. 21, 2004

(54) ENCRYPTION KEY EXCHANGE PROTOCOL

(75) Inventors: Brian R. Parisien, Dunrobin (CA); Michael C. G. Lee, Ottawa (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/475,044

(22) Filed: Dec. 30, 1999

(51) Int. Cl.[7] .............................................. H04L 9/00
(52) U.S. Cl. ........................... 380/47; 380/44; 380/259; 380/281; 380/284
(58) Field of Search ........................... 380/44, 45, 47, 380/281, 284, 259

(56) References Cited

U.S. PATENT DOCUMENTS

| | | | |
|---|---|---|---|
| 4,423,287 A | * 12/1983 | Zeidler | 705/71 |
| 5,602,917 A | * 2/1997 | Mueller | 380/284 |
| 5,629,980 A | * 5/1997 | Stefik et al. | 705/54 |
| 5,884,270 A | * 3/1999 | Walker et al. | 705/1 |
| 6,192,473 B1 | * 2/2001 | Ryan et al. | 713/168 |
| 6,292,896 B1 | * 9/2001 | Guski et al. | 713/169 |
| 6,307,936 B1 | * 10/2001 | Ober et al. | 380/30 |
| 6,523,696 B1 | * 2/2003 | Saito et al. | 709/223 |
| 6,628,786 B1 | * 9/2003 | Dole | 380/44 |

FOREIGN PATENT DOCUMENTS

WO    9741661    4/1997

OTHER PUBLICATIONS

Applied Cryptography : Protocols, Algorithms & Source Code in C By Bruce Schneier, Published in 1995 pp. 47 to 60.

\* cited by examiner

*Primary Examiner*—Justin T. Darrow
*Assistant Examiner*—Kambiz Zand

(57) ABSTRACT

The calculation of encryption keys is a processor intensive undertaking that is not suited for "thin client" terminal devices typically used for session applications in an Internet Protocol network. The present invention provides an encryption scheme for use with such terminal devices for the secure transmission of session data that minimizes session set-up delays associated with the exchange of encryption keys. First, keys are negotiated between network elements using prior art techniques (e.g. shared secret, IKE, Diffie-Hellman, RSA). Then, security is maintained by refreshing symmetric keys after each session under cover of an existing key. Perfect Forward Security (PFS) can be provided by "breaking the chain" through periodic key refreshes during system idle times.

46 Claims, 4 Drawing Sheets

ENCRYPTION KEY EXCHANGE PROTOCOL

FIELD OF THE INVENTION

This invention relates to an encryption scheme, and in particular to an encryption key exchange protocol for real-time applications.

BACKGROUND OF THE INVENTION

Though originally designed for the transmission of data, Internet Protocol (IP) networks are increasingly being used as an alternative voice communication tool. In recent years there have been many advancements and developments in the area of IP telephony, which refers to communication services e.g. voice, facsimile, and/or voice-messaging applications that are transported via an Internet Protocol network, rather than the Public Switched Telephone Network (PSTN). Telephone subscribers are drawn to IP telephony as an alternative to traditional forms of communications, especially for long-distance telephone calls, because it can offer cost savings relative to the PSTN. With the use of IP telephony, subscribers can bypass long-distance carriers and their per-minute usage rates and run their voice traffic over an IP network, such as the Internet, for a flat monthly Internet access fee. IP networks are increasingly being used for real-time non-telephony applications as well, including e-commerce applications.

The drawbacks to the use of IP networks are well known. Among these drawbacks are vulnerabilities that include (i) spoofing, in which one machine on the network masquerades as another, (ii) sniffing, in which an eavesdropper listens in on a transmission between two other parties, (iii) session hijacking, in which an attacker employing both of the above techniques misappropriates a transmission line and masquerades as one of the communicating parties and (iv) denial of service attacks, in which a party is denied service due to the improper intervention of an attacker.

An international working group organized under the Internet Engineering Task Force (IETF) has developed methods of securing Internet communications that alleviate, to some extent, all of the above vulnerabilities. These methods are known as the IP Security (IPSec) protocol suite, which are based on powerful encryption technologies to provide secured Internet communications. One aspect of IPSec is the Internet Key Exchange (IKE), a protocol that allows users to agree on a variety of issues, including authentication, encryption, selection of keys, etc. that allow for secure key and data exchange between users.

Internet Key Exchange (IKE) uses public key cryptography standards such as RSA and Diffie-Hellman to negotiate encryption keys between users. However, there are high computational overheads associated with the processing of public key algorithms. For this reason, public key algorithms are rarely used for the encryption of real-time data, such as that associated with telephony applications over IP networks. For such real-time applications, modern cryptographic systems utilize conventional symmetric key technology, while public key algorithms are typically limited to automate key distribution and management.

The calculation of symmetric or "session" keys for the bulk encryption of data is a processor-intensive operation. To meet the requirements for the speedy calculation of such encryption keys, hardware-based cryptographic accelerators have been developed, including cryptographic co-processors, chip sets, PC-boards, PCMCIA cards, etc.

However, for cost reasons, terminal devices (e.g. thin client IP telephony devices or e-commerce devices) used for secure applications over IP networks typically have limited processing resources. This makes secure key exchange and generation delays prohibitive during session set-up. For example, typical Diffie-Hellman key exchange would require up to 30 seconds on a low-end thin client.

What is not found in the prior art is an encryption scheme for use with such terminal devices for the secure transmission of data over IP networks that minimizes session set-up delays associated with the exchange of encryption keys.

SUMMARY OF THE INVENTION

As noted above, the prior art in secure Internet communication protocols was designed for data applications and services which typically operate between powerful servers and end terminals, such as personal computers (PCs). By contrast, the present invention is particularly useful for thin client devices with limited resources, and for transactions for which users have expectations of very little delay (e.g. session set-up).

The present invention involves a number of steps, the first of which is the negotiation of secret encryption session keys between a key distribution broker (or simply "key broker") and thin clients. Subsequent steps involve the refreshing of encryption keys at the end of each session thereby limiting exposure and vulnerability to security attacks. The preset invention enables session keys to be changed on a per session basis without the delays associated with typical open channel key exchange protocols such as IKE.

The method of the present invention operates in a consistent fashion for two-party, three-party and multi-party services structures, and across network boundaries.

Through the use of the key broker, session set-up delays associated with key exchange are reduced. A lightweight protocol enables the use of low cost thin end terminal devices. A limited lifetime for such session keys provides enhanced security through reduced exposure.

The method of the present invention is compatible with prior art security protocols. First, a secure channel between network elements is initiated using prior art techniques (e.g. shared secret, IKE, Diffie-Hellman, RSA, out of band methods such as pre-shared keys or passwords, etc.).

Then, security is maintained by refreshing encryption keys after each session under cover of an existing key. Perfect Forward Security (PFS) can be provided by "breaking the chain" through periodic key refreshes during system idle times.

In accordance with an aspect of the present invention there is provided a method of distributing encryption keys in a network including (i) a key broker negotiates encryption key K1 with a first party; (ii) the key broker negotiates encryption key K2 with a second party; (iii) the key broker encrypts K2 with K1; and, (iv) the key broker forwards the encrypted K2 to the first party.

In accordance with another aspect of the present invention there is provided a method of distributing encryption keys in a network including (i) a key broker negotiates encryption key K1 with a first party; (ii) the key broker negotiates encryption key K2 with a second party; (iii) the key broker negotiates encryption key K3 with a third party; (iv) the key broker encrypts K2 with K1 and forwards said encrypted K2 to the first party; and, (v) the key broker encrypts K2 with K3 and forwards said encrypted K2 to the third party.

In accordance with another aspect of the present invention there is provided a method of distributing encryption keys between a first network and a second network including: (i)

a first key broker connected to the first network negotiates encryption key K1 with a first party; (ii) a second key broker connected to the second network negotiates encryption key K3 with a second party; (iii) the first key broker negotiates K2 with the second key broker; (iv) the second key broker encrypts K3 with K2; (v) the second key broker forwards the encrypted K3 to the first key broker; (vi) the first key broker decrypts K3 with K2; (vii) the first key broker encrypts K3 with K1; and (viii) the first key broker forwards the encrypted K3 to the first party.

In accordance with yet another aspect of the present invention there is provided a computer program product for programming a key broker in a network, the computer program product having a medium with a computer program embodied thereon, the computer program having computer program code that: (i) negotiates encryption key K1 between the key broker and a first party; (ii) negotiates encryption key K2 between the key broker and a second party; (iii) encrypts K2 with K1; and, (iv) forwards the encrypted K2 to the first party.

In accordance with yet another aspect of the present invention there is provided a key broker in a network that: (i) negotiates encryption key K1 with a first party; (ii) negotiates encryption key K2 with a second party; (iii) encrypts K2 with K1; and, (iv) forwards the encrypted K2 to the first party.

BRIEF DESCRIPTION OF THE DRAWINGS

Preferred embodiments of the invention will now be described with reference to the attached drawings in which.

DETAILED DESCRIPTION OF THE PREFERRED EMBODIMENT

Figure 1:
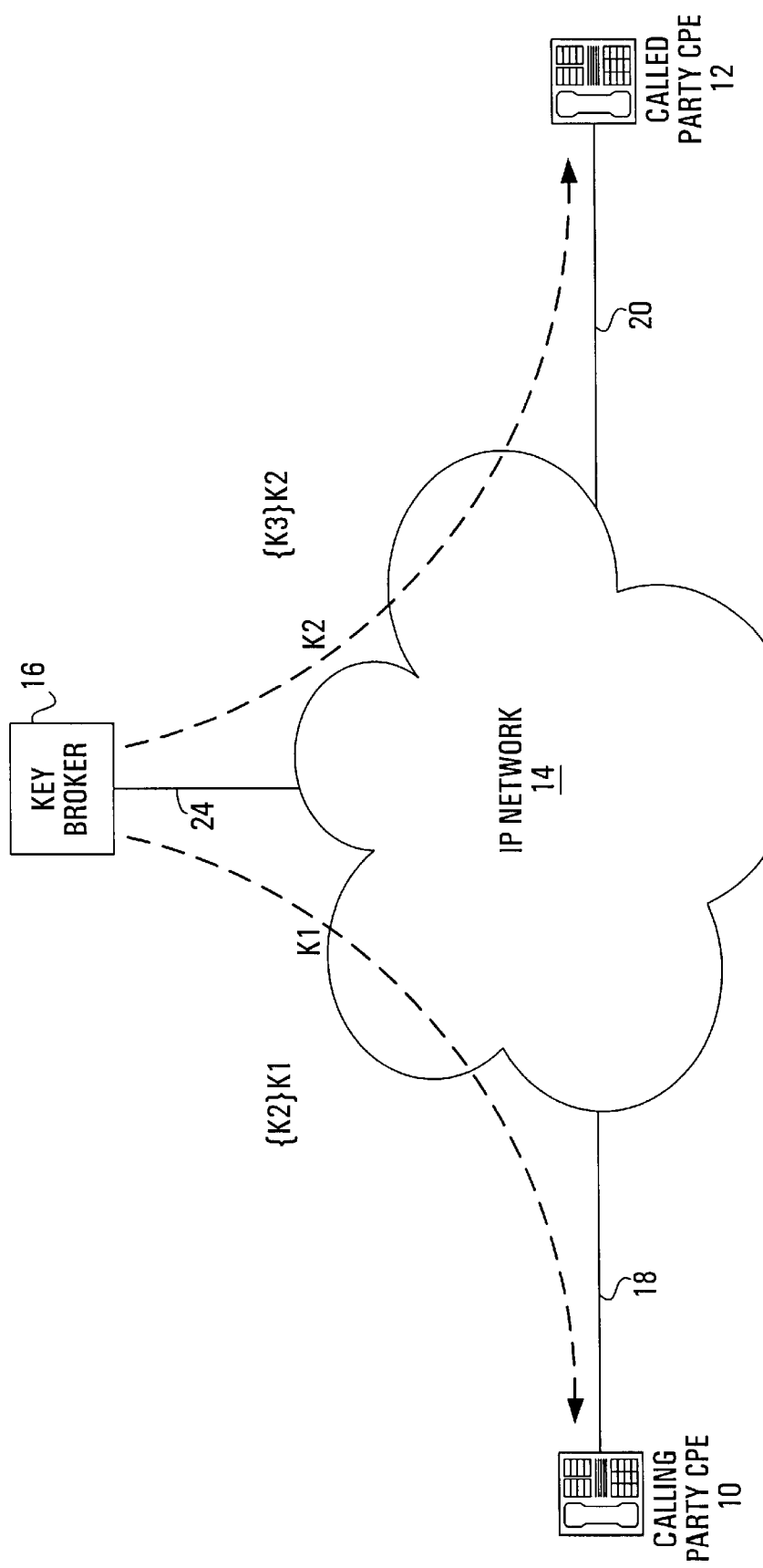
FIG. 1 is a block diagram of the network elements associated with the method of the present invention as applied to a two-party session.

FIG. 1 is a block diagram of the network elements associated with the method of the present invention as applied to a two-party session between calling party Customer Premises Equipment (CPE) 10 and called party CPE 12. Calling party CPE 10 and called party CPE 12 are IP network thin client devices of the type known in the prior art to be used for IP applications such as voice communications. Such devices are known in the art as "thin clients" because they contain limited processing and storage power. They are designed to provide an inexpensive means for users to connect to an IP network and to be provided with IP services.

In FIG. 1, calling party CPE 10 is connected via communications link 18 to IP network 14. Likewise, called party CPE 12 is connected via communications link 20 to IP network 14. Communications links 18, 20 could be Ethernet, cable modem, Digital Subscriber Line (DSL), Asynchronous Transfer Mode (ATM) links, etc. IP network 14 is a packet switched data network. Typically, IP network 14 could comprise at least a portion of the Internet, or a private enterprise network, or Virtual Public Network (VPN) over public facilities. Though an IP network is illustrated, the present invention could work with any network where secure communications are required.

Key broker 16 is a personal computer or mini computer that may also manage the operation of thin client calling party CPE 10 and thin client called party CPE 12 via links 24, IP network 14 and links 18 or 20 as the case may be. Exemplary products that may be used to implement the key broker 16 include IBM RS/6000, SUN MICROSYSTEMS SPARC Station, and HEWLETT PACKARD HP 9000, running an operating system such as MICROSOFT WINDOWS NT. The key broker 16 possesses the processing power necessary to administer, control, process and manage the necessary applications through calling party CPE 10 and called party CPE 12. This includes the processing power necessary to calculate encryption keys for use by calling party CPE 10 and called party CPE 12, and may include as well the capability for testing, trouble reporting, configuration, installation, protocol translation, etc.

The method of the present invention avoids unnecessary delay by pre-establishing a set of symmetric encryption keys (i.e. "session" keys) for immediate use by network elements such as calling party CPE 10 and called party CPE 12. This set of encryption keys is used for both signaling and bearer channel authentication and protection. Once an encryption key is used by a network element for a session (such as a call), the existing encryption key is then used to establish a fresh encryption key for the network element. The old key is then discarded. In this manner, these one-time session keys shared between network entities during the course of a session are immediately invalidated after the transaction is completed, thereby eliminating their use for unauthorized purposes. The chaining of secure key exchanges avoids time consuming open channel key exchanges by sending new keys over pre-secured channels. Perfect Forward Security (PFS) can be provided by "breaking the chain" through periodic key refreshes during system idle times using prior art techniques.

Figure 2:
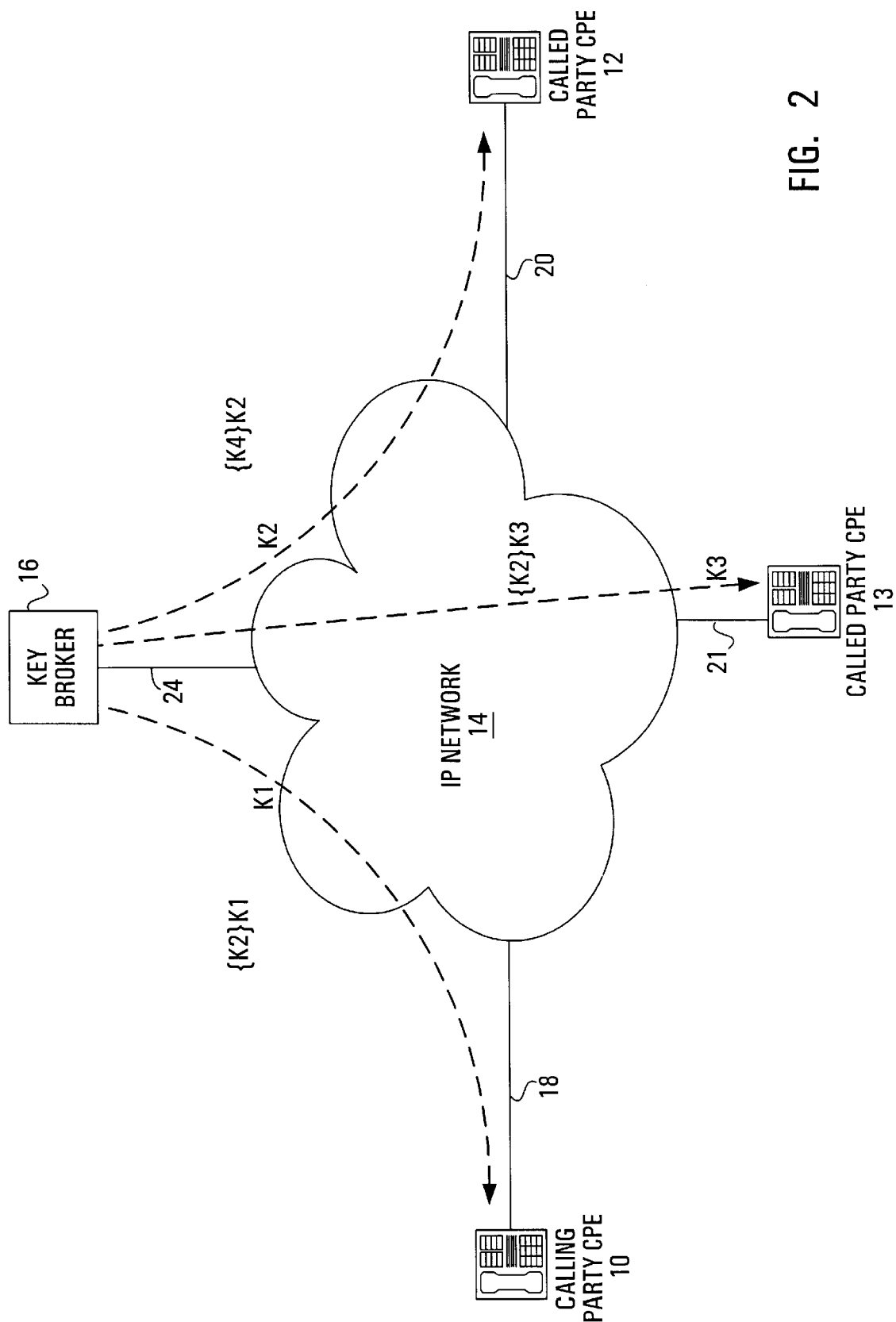
FIG. 2 is a block diagram of the network elements associated with the method of the present invention as applied to a three-party session.
Figure 3:
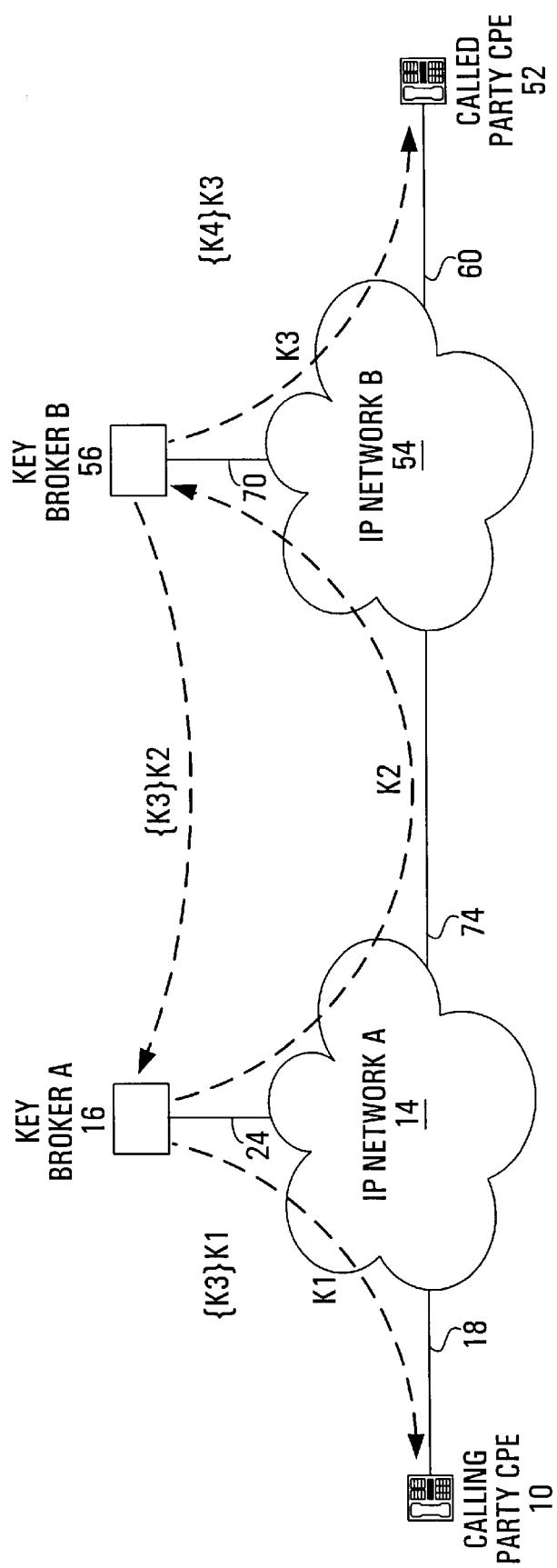
FIG. 3 is a block diagram of the network elements associated with the method of the present invention as applied to a two-party session across two IP networks.

The dotted lines in FIG. 1 are meant to represent a logical link to illustrate the negotiation and/or forwarding of keys between key broker 16 and calling party CPE 10 and called party CPE 12, in accordance with the following methods described in relation to FIGS. 1, 2 and 3. In practice, the encryption keys used in accordance with the present invention would be negotiated and/or transmitted across communication links 18, 20 and 24, as the case may be.

The method of the present invention comprises the following steps in the context of a two-party session between calling party CPE 10 and called party CPE 12:

1. Key broker 16 negotiates keys K1 & K2 with calling party CPE 10 and called party CPE 12 respectively using any established prior art technique, such as IKE, Diffie-Hellman, RSA, out of band methods such as pre-shared keys or passwords, etc.). In the preferred embodiment, this step is performed during a time of the day when session frequency is low in the network, or at some set initialization time. Key broker 16 keeps a record of K1 & K2.
2. Calling party CPE 10 initiates a communication session with called party CPE 12 across links 18 and 24 to key broker 16.
3. Key broker 16 encrypts K2 with K1 (shown as {K2}K1 on the figure) and transmits the encrypted data to calling party CPE 10 across communications links 24 and 18.
4. Using K1, calling party CPE 10 decrypts K2.

5. Using K2, calling party CPE 10 encrypts session data, such as voice and forwards such encrypted data across communications links 18 and 20 to called party CPE 12.
6. Using K2, called party CPE 12 decrypts the received session data.
7. Using K2, called party CPE 12 encrypts session data across communications links 20 and 18 to calling party CPE 10.
8. Using K2, calling party CPE 10 decrypts the received session data.
9. Steps 5 through 8 are repeated until the session is terminated.
10. Key broker 16 calculates K3.
11. Key broker 16 encrypts K3 with K2 (shown as {K3}K2 on the figure) and transmits the encrypted data to called party CPE 12 across communications links 24 and 20.
12. Called party CPE,12 uses K2 to decrypt K3.
13. Called party CPE 12 discards K2 and stores K3 for use in the next session from calling party CPE 10, or any other network entity.

Though it is preferred that the encryption key of the "called" party is forwarded to the "calling" party before session data is exchanged, the present invention can also work where the encryption key of the "calling" party is forwarded to the "called" party before session data is exchanged.

As explained above, it is preferred that key broker 16 periodically refresh all encryption keys (such as K1 and K2 or K3 as the case may be) during system idle times using prior art techniques. Such refreshing of keys should preferably take place once every 24 hours.

FIG. 2 is a block diagram of the network elements associated with the method of the present invention as applied to a three-party session between calling party CPE 10, called party CPE 12 and called party CPE 13. All of the network elements and connections of FIG. 1 remain unchanged, with the addition of communication link 21 between called party CPE 13 and IP network 14. Communications link 21 could be Ethernet, cable modem, Digital Subscriber Line (DSL), Asynchronous Transfer Mode (ATM) links, etc.

The method of the present invention comprises the following steps in the context of a two-party session between calling party CPE 10 and called party CPE 12:

1. Key broker 16 negotiates keys K1, K2 & K3 with calling party CPE 10, called party CPE 12, and called party CPE 13 respectively using any established prior art technique. In the preferred embodiment, this step is performed during a time of the day when session frequency is low in the network, or at some set initialization time. Key broker 16 keeps a record of K1, K2 & K3.
2. Calling party CPE 10 initiates a communication session with called party CPE 12 across communication links 18 and 24 to key broker 16.
3. Key broker 16 encrypts K2 with K1 (shown as {K2}K1 on the figure) and transmits the encrypted data to calling party CPE 10 across communications links 24 and 18.
4. Using K1, calling party CPE 10 decrypts K2.
5. The session proceeds as with steps 5–8 described above for the FIG. 1 embodiment until either one of calling party CPE 10 and called party CPE 12 initiates a conference session to called party CPE 13 through key broker 16.
6. Key broker 16 encrypts K2 with K3 (shown as {K2}K3 on the figure) and transmits the encrypted data to called party CPE 13 across communications links 24 and 21.
7. Using K3, called party CPE 13 decrypts K2.
8. The session proceeds as with step 5 above for this FIG. 2 embodiment with all parties using K2 to encrypt and decrypt session data until the session is terminated.
9. Key broker 16 calculates K4.
10. Key broker 16 encrypts K4 with K2 (shown as {K4}K2 on the figure) and transmits the encrypted data to called party CPE 12 across communications links 24 and 20.
11. Called party CPE 12 uses K2 to decrypt K4.
12. Called party CPE 12 discards K2 and stores K4 for use in the next session.

Persons skilled in the art will quickly understand how the above technique can also be used on a scaled basis to apply to four-way, five-way, etc. calls. Due to the symmetric nature of the key exchange, this method applies equally where bearer channel servers exist, e.g. collaborative network application servers such as conference bridges.

As with the description of FIG. 1, the present invention applied to a three-way session (and more) can also work where the encryption key of the "calling" party is forwarded to both the "called" parties before session data is exchanged. As well, it is preferred that key broker 16 periodically refresh encryption keys K1, K2 and K3 (or K4 as the case may be) during system idle times using prior art techniques. Such refreshing of keys should preferably take place once every 24 hours.

FIG. 3 is a block diagram of the network elements associated with the method of the present invention as applied to a two-party session across two distinct IP networks, IP network A 14 and IP network B 54 connected by communications link 74. Key broker B 56 is connected to IP network B via link 70, and called party CPE 52 is connected to IP network B 54 via link 60. In this context, the method of the present invention comprises the following steps:

1. Key broker A 16 negotiates encryption key K1 with calling party CPE 10, and key broker B 56 negotiates encryption key K3 with called party CPE 52 using any established prior art technique. In the preferred embodiment, this step is performed during a time of the day when session frequency is low in the network, or at some set initialization time. Key broker A 16 keeps a record of K1 and key broker B 56 keeps a record of K3.
2. Calling party CPE 10 initiates a communication session with called party CPE 52 across communication links 18 and 24 to key broker A 16.
3. Key broker A 16 negotiates K2 with key broker B 56 using prior art techniques across communication links 24, 74 and 70.
4. Key broker B 56 encrypts K3 with K2 (shown as {K3}K2 on the figure) and transmits the encrypted data to key broker A 16 across communications link 70, 74 and 24.
5. Using K2, key broker A 16 decrypts K3.
6. Key broker A 16 encrypts K3 with K1 (shown as {K3}K1 on the figure) and transmits the encrypted data to calling party CPE 10 across communications links 24 and 18.
7. Using K1, calling party CPE 10 decrypts K3.
8. Using K3, calling party CPE 10 encrypts session data, such as voice and forwards such encrypted data across communications links 18, 74 and 60 to called party CPE 52.

9. Using K3, called party CPE 52 decrypts the received session data.

10. Using K3, called party CPE 52 encrypts session data across communications links 60, 74 and 18 to calling party CPE 10.

11. Using K3, calling party CPE 10 decrypts the received session data.

12. Steps 8 through 11 are repeated until the session is terminated.

13. Key broker B 56 calculates encryption key K4.

14. Key broker B 56 encrypts K4 with K3 (shown as {K4}K3 on the figure) and transmits the encrypted data to called party CPE 52 across communications links 70 and 60.

15. Called party CPE 52 uses K3 to decrypt K4.

16. Called party CPE 52 discards K3 and stores K4 for use in the next session from calling party CPE 10 or any other network entity in either IP network A 14 or IP network B 54.

As explained above, it is preferred that key broker A 16 and key broker B 56 periodically refresh encryption keys K1 and K3 (or K4 as the case may be) during system idle times using prior art techniques. Such refreshing of encryption keys should preferably take place once every 24 hours.

Figure 4:
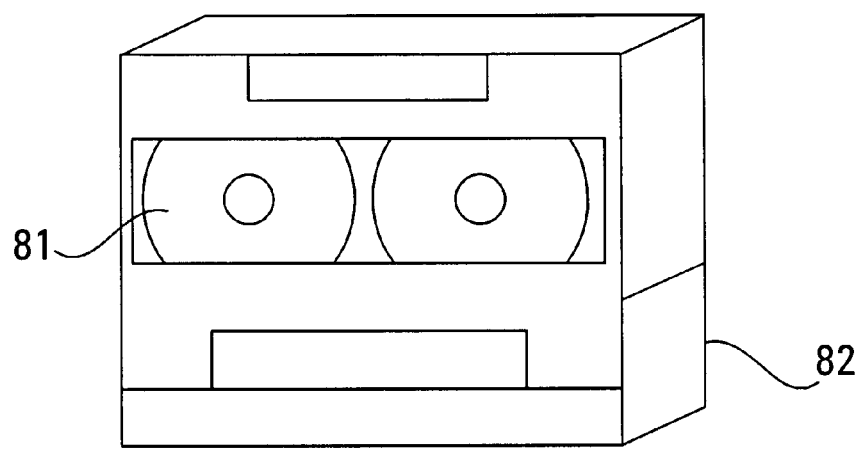
FIG. 4 shows one example of a medium on which a computer program which implements the present invention may be stored.

The present invention is typically implemented using a computer program product that forms part of a key broker and a CPE (such as key broker 16, and calling party CPE 10 and called party CPE 12 in FIG. 1). Appropriate computer program code in combination with such devices implements the steps of the present invention. This computer program code is often stored on a storage medium, such as a diskette, hard disk, CD-ROM, or tape. The medium can also be a memory storage device or collection of memory storage devices such as read-only memory (ROM) or random access memory (RAM). FIG. 4 illustrates one example of a storage medium. FIG. 4 shows a tape cartridge of the type where magnetic medium 81 is enclosed in a protective cassette 82. Magnetic field changes over the surface of the magnetic media 81 are used to encode the computer program code.

The above description of a preferred embodiment should not be interpreted in any limiting manner since variations and refinements can be made without departing from the spirit of the invention. The scope of the invention is defined by the appended claims and their equivalents.

We claim:

1. A method of distributing encryption keys in a network comprising the steps of:

a key broker negotiating encryption key K1 with a first party;

the key broker negotiating encryption key K2 with a second party;

the key broker encrypting K2 with K1;

the key broker forwarding the encrypted K2 to the first party;

the first party decrypting K2 with K1;

the first party encrypting session data with K2; and the first party forwarding the encrypted session data to the second party across the network.

2. The method of claim 1 further including the step of the second party decrypting the encrypted session data using K2.

3. The method of claim 1 further including the step of:

at a time subsequent to the key broker's negotiating encryption keys K1 and K2, the key broker negotiating new encryption key K1 with the first party and new encryption key K2 with the second party.

4. The method of claim 3 wherein said time subsequent to the key broker's negotiating encryption keys is once every 24 hours.

5. The method of claim 1 wherein the network is an Internet Protocol network.

6. The method of claim 1 wherein the key broker negotiates encryption key K1 with the first party using any one of the Internet Key Exchange protocol, Diffie-Hellman protocol, RSA protocol or out of band protocol.

7. The method of claim 1 wherein the key broker negotiates encryption key K2 with the second party using any one of the Internet Key Exchange protocol, Diffie-Hellman protocol, RSA protocol or out of band protocol.

8. A method of distributing encryption keys in a network comprising the steps of:

a key broker negotiating encryption key K1 with a first party;

the key broker negotiating encryption key K2 with a second party;

the key broker encrypting K2 with K1;

the key broker forwarding the encrypted K2 to the first party;

the second party encrypting session data with K2; and the second party forwarding the encrypted session data to the first party across the network.

9. A method of distributing encryption keys in a network comprising the steps of:

a key broker negotiating encryption key K1 with a first party;

the key broker negotiating encryption key K2 with a second party;

the key broker encrypting K2 with K1;

the key broker forwarding the encrypted K2 to the first party;

the key broker calculating encryption key K3;

the key broker encrypting K3 with K2;

the key broker forwarding the encrypted K3 to the second party;

the second party decrypting the encrypted K3 with K2; and after storing K3, the second party discarding K2.

10. A method of distributing encryption keys in a network comprising the steps of:

a key broker negotiating encryption key K1 with a first party;

the key broker negotiating encryption key K2 with a second parry;

the key broker negotiating encryption key K3 with a third parry;

the key broker encrypting K2 with K1 and forwarding said encrypted K2 to the first party; and, the key broker encrypting K2 with K3 and forwarding said encrypted K2 to the third party.

11. The method of claim 10 further including the steps of:

the first party decrypting K2 with K1; and the third party decrypting K2 with K3.

12. The method of claim 11 further including the steps of the:

first party encrypting session data with K2;

the first party forwarding the encrypted session data to the second party and the third party across the network.

13. The method of claim 11 further including the steps of:
the second party encrypting session data with K2;
the second party forwarding the encrypted session data to the first party and the third party across the network.

14. The method of claim 11 including the steps of:
the third party encrypting session data with K2;
the third party forwarding the encrypted session data to the first party and the second party across the network.

15. The method of claim 12 further including the step of the second party and the third party decrypting the encrypted session data from the first party using K2.

16. The method of claim 13 further including the step of the first party and the third party decrypting the encrypted session data from the second party using K2.

17. The method of claim 14 further including the step of the first party and the second party decrypting the encrypted session data from the third parry using K2.

18. The method of claim 10 further including the step of:
at a time subsequent to the key broker's negotiating encryption keys K1, K2 and K3, the key broker negotiating new encryption key K1 with the first party, new encryption key K2 with the second party, and new encryption key K3 with the third party.

19. The method of claim 18 wherein said subsequent to the key broker's negotiating encryption keys time is once every 24 hours.

20. The method of claim 10 wherein the network is an Internet Protocol network.

21. The method of claim 10 wherein the key broker negotiates encryption key K1 with the first party using any one of the Internet Key Exchange protocol, Diffie-Hellman protocol, RSA protocol or out of band protocol.

22. The method of claim 10 wherein the key broker negotiates encryption key K2 with the second party using any one of the Internet Key Exchange protocol, Diffie-Hellman protocol, RSA protocol or out of band protocol.

23. The method of claim 10 wherein the key broker negotiates encryption key K3 with the third party using any one of the Internet Key Exchange protocol, Diffie-Hellman protocol, RSA protocol or out of band protocol.

24. A method of distributing encryption keys in a network comprising the steps of:
a key broker negotiating encryption key K1 with a first party;
the key broker negotiating encryption key K2 with a second party;
the key broker negotiating encryption key K3 with a third party;
the key broker encrypting K2 with K1 and forwarding said encrypted to the first party;
the key broker encrypting K2 with K3 and forwarding said encrypted K2 to the third party;
the key broker calculating encryption key K4;
the key broker encrypting K4 with K2;
the key broker forwarding the encrypted K4 to the second party;
the second party decrypting the encrypted K4 with K2; and
after storing K4, the second party discarding K2.

25. A method of distributing encryption keys between a first network and a second network comprising the steps of:
a first key broker connected to the first network negotiating encryption key K1 with a first party;
a second key broker connected to the second network negotiating encryption key K3 with a second party;
the first key broker negotiating K2 with the second key broker;
the second key broker encrypting K3 with K2;
the second key broker forwarding the encrypted K3 to the first key broker;
the first key broker decrypting K3 with K2;
the first key broker encrypting K3 with K1; and
the first key broker forwarding the encrypted K3 to the first party.

26. The method of claim 25 further including the steps of:
at a time subsequent to the first key broker's negotiating the encryption key K1, the first key broker negotiating new encryption key K1 with the first party; and
at a time subsequent to the second key broker's negotiating the encryption key K3, the second key broker negotiating new encryption key K3 with the second party.

27. The method of claim 26 wherein said time subsequent is once every 24 hours.

28. The method of claim 25 wherein the network is an Internet Protocol network.

29. The method of claim 25 wherein the first key broker negotiates encryption key K1 with the first party using any one of the Internet Key Exchange protocol, Diffie-Hellman protocol RSA protocol or out of band protocol.

30. The method of claim 25 wherein the second key broker negotiates encryption key K2 with the second party using any one of the Internet Key Exchange protocol, Diffie-Hellman protocol, RSA protocol or out of band protocol.

31. A method of distributing encryption keys between a first network and a second network comprising the steps of:
a first key broker connected to the first network negotiating encryption key K1 with a first party;
a second key broker connected to the second network negotiating encryption key K3 with a second party;
the first key broker negotiating K2 with the second key broker;
the second key broker encrypting K3 with K2;
the second key broker forwarding the encrypted K3 to the first key broker;
the first key broker decrypting K3 with K2;
the first key broker encrypting K3 with K1; and
the first key broker forwarding the encrypted K3 to the first party;
the first party decrypting K3 with K1;
the first party encrypting session data with K3; and
the first party forwarding the encrypted session data to the second party across the first network and the second network.

32. The method of claim 31 further including the step of the second party decrypting the encrypted session data using K3.

33. The method of claim 31 further including the steps of:
the second party encrypting session data with K3; and
the second party forwarding the encrypted session data to the first party across the second network and the first network.

34. A method of distributing encryption keys between a first network and a second network comprising the steps of:
a first key broker connected to the first network negotiating encryption key K1 with a first party;
a second key broker connected to the second network negotiating encryption key K3 with a second party;

the first key broker negotiating K2 with the second key broker;

the second key broker encrypting K3 with K2;

the second key broker forwarding the encrypted K3 to the first key broker;

the first key broker decrypting K3 with K2;

the first key broker encrypting K3 with K1; and the first key broker forwarding the encrypted K3 to the first party;

the second key broker calculating encryption key K4;

the second key broker encrypting K4 with K3;

the second key broker forwarding the encrypted K4 to the second party; and the second party decrypting K4 with K3;

after storing K4, the second party discarding K3.

35. A computer program product for programming a key broker in a network, the computer program product having a medium with a computer program embodied thereon, the computer program comprising computer program code for: (i) negotiating encryption key K1 between the key broker and a first party; (ii) negotiating encryption key K2 between the key broker and a second party; (iii) encrypting K2 with K1; (iv) forwarding the encrypted K2 to the first pay; (v) calculating encryption key K3; (vi) encrypting K3 with K2; (vii) forwarding the encrypted K3 to the second party; and (viii) causing the second party to discard K2.

36. The computer program product of claim 35 further including computer program code negotiating new encryption key K1 with the first party, and negotiating new encryption key K2 with the second party at a time subsequent to the negotiating of encryption keys K1 and K2.

37. The computer program product of claim 36 wherein said time subsequent to negotiating of encryption keys K1 and K2 is once every 24 hours.

38. The computer program product of claim 35 wherein the network is an Internet Protocol network.

39. The computer program product of claim 35 wherein the key broker negotiates encryption key K1 with the first party using any one of the Internet Key Exchange protocol, Diffie-Hellman protocol, RSA protocol or out of band protocol.

40. The computer program product of claim 35 wherein the key broker negotiates encryption key K3 with the second party using any one of the Internet Key Exchange protocol, Diffie-Hellman protocol, RSA protocol or out of band protocol.

41. A key broker in a network for: (i) negotiating encryption key K1 with a first party; (ii) negotiating encryption key K2 with a second party; (iii) encrypting K2 with K1; (iv) forwarding the encrypted K2 to the first party; (v) calculating encryption key K3; (vi) encrypting K3 with K2; (vii) forwarding the encrypted K3 to the second party; and (viii) causing the second party to discard K2.

42. The key broker of claim 41 further including means for negotiating new encryption key K1 with the first party, and negotiating new encryption key K2 with the second party at a time subsequent to the negotiating of encryption keys K1 and K2.

43. The key broker of claim 42 wherein said time subsequent to the negotiating of encryption keys K1 and K2 is once every 24 hours.

44. The key broker of claim 41 wherein the network is an Internet Protocol network.

45. The key broker of claim 41 wherein the key broker negotiates encryption key K1 with the first party using any one of the Internet Key Exchange protocol, Diffie-Hellman protocol, RSA protocol or out of band protocol.

46. The key broker of claim 41 wherein the key broker negotiates encryption key K2 with the second party using any one of the Internet Kay Exchange protocol, Diffie-Hellman protocol, RSA protocol out of band protocol.

* * * * *

UNITED STATES PATENT AND TRADEMARK OFFICE
CERTIFICATE OF CORRECTION

PATENT NO. : 6,795,555 B1
DATED : September 21, 2004
INVENTOR(S) : Brian R. Parisien et al.

It is certified that error appears in the above-identified patent and that said Letters Patent is hereby corrected as shown below:

Column 8,
Line 52, "...parry;..." should read -- ...party;... --.
Line 54, "...parry..;." should read -- ...party;... --.
Lines 63-64, "...steps of the:..." should read -- ...steps of:... --.
Line 65, "...first..." should read -- ...the first... --.

Column 9,
Line 5, "...including..." should read -- ...further including... --.
Line 18, "...parry..." should read -- ...party... --.
Line 51, "...encrypted..." should read -- ...encrypted K2... --.

Column 11,
Line 25, "...pay;..." should read -- ...party;... --.

Column 12,
Line 35, "...Kay..." should read -- ...Key... --.
Line 36, "...protocol..." should read -- ...protocol or... --.

Signed and Sealed this

Sixth Day of September, 2005

JON W. DUDAS
*Director of the United States Patent and Trademark Office*